Oct. 26, 1948.   M. A. HOBURG ET AL   2,452,237
WATERING TROUGH
Filed April 20, 1946

INVENTORS
MASON A. HOBURG
FRANCES HOBURG
BY Edward C. Healy
ATTORNEY

Patented Oct. 26, 1948

2,452,237

UNITED STATES PATENT OFFICE 2,452,237

WATERING TROUGH

Mason A. Hoburg and Frances Hoburg, St. Helena, Calif.; said Frances Hoburg assignor to said Mason A. Hoburg Application April 20, 1946, Serial No. 663,718

1 Claim. (Cl. 119—72)

This invention relates to an improved watering trough and has particular reference to an especially constructed watering trough to supply water for turkeys, chickens and like fowl.

It is a common practice in the raising of fowl to provide muriatic acid or other like ingredients in water to purify the same. Disintegration soon takes place when the troughs are made of wood. The solution when placed in a trough made of metal disintegrates the metal and pollutes the water causing the fowl to become ill. It is therefore an object of the present invention to provide an improved watering trough for fowl and to construct the outer housing of a substantial material, such as wood or metal and to line the same with an acid-resisting material such as porcelain, tile, unbreakable glass, plastic, enamel, or the like.

Another object of the present invention is the provision of a mixing compartment, whereby the muriatic acid or other like acids are thoroughly remixed into the water before the water passes into the trough proper.

Another object of the present invention is the provision of a watering trough of the character described which is simple in construction, durable, and economical to manufacture.

Other objects and advantages will be apparent during the course of the following description.

Figure 1:
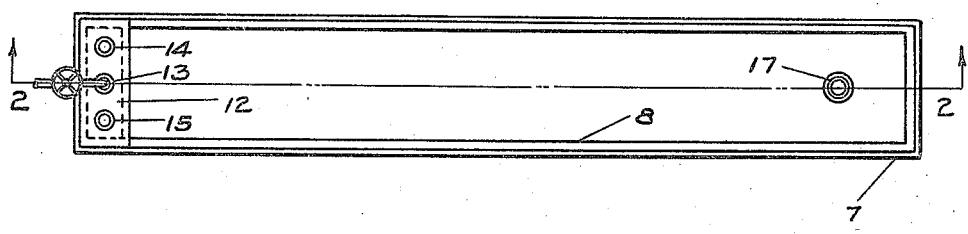
Figure 2:
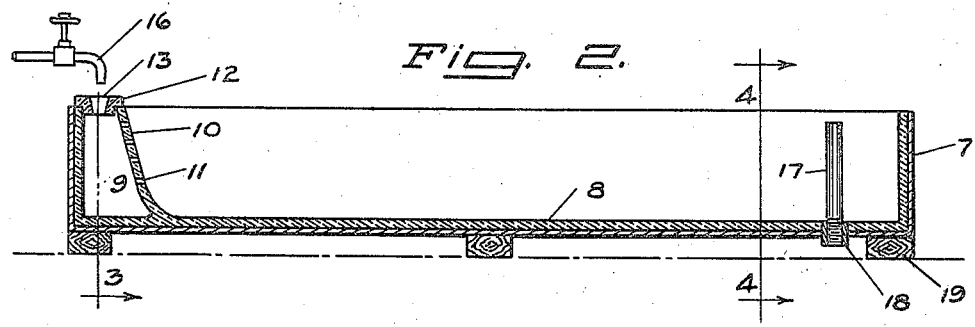
Figure 3:
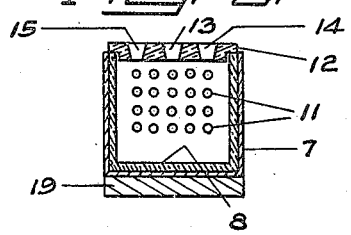
Figure 4:
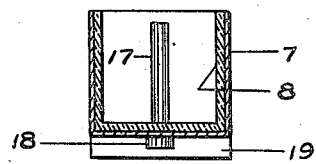
Figure 5:
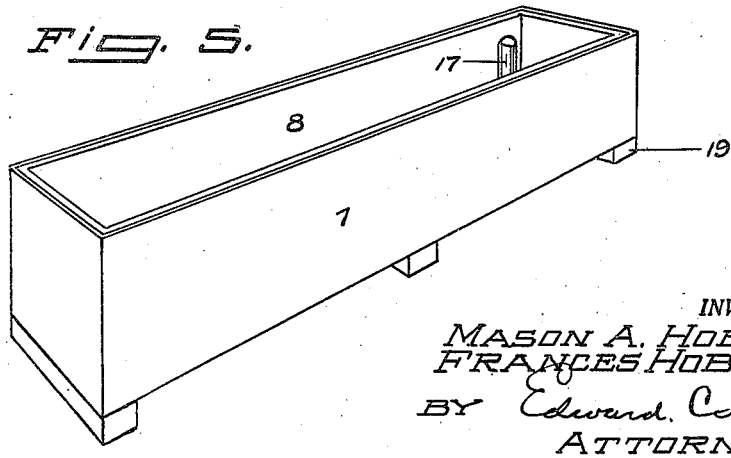

In the accompanying drawing forming a part of the specification and wherein for the purpose of illustration like numerals designate like parts throughout the same, Fig. 1 is a top plan view of the improved watering trough, Fig. 2 is a central longitudinal section, the view being taken on line 2—2 of Fig. 1 illustrating a compartment at one end of the trough into which the water and other purifying agent for the trough are supplied, Fig. 3 is an end sectional view of the said compartment, the view being taken on the line 3—3 of Fig. 1, looking in the direction of the arrow, Fig. 4 is an end sectional view of the trough, the view being taken on line 4—4, looking in direction of the arrow, and Fig. 5 is a perspective view of the improved acid-resisting trough, the said compartment being eliminated.

Referring in detail to the different parts wherein for the purpose of illustration is shown a preferred embodiment of the invention, the numeral 7 designates the outer housing of the trough preferably made of sheet metal but can be wood or any suitable material. The numeral 8 designates the inner exposed surface of the trough that is made of any suitable acid-resisting material such as porcelain, unbreakable glass, plastic or tile and formed integral with the housing or made in sections cemented together and mounted therein. The numeral 9 designates a small compartment into which the muriatic acid and the water are supplied to form a complete mixture before entering the trough proper. It will be noted that the compartment wall 10 is equipped with a plurality of small spaced apertures 11 to enable the commingled fluids to slowly flow into the trough. A removable cover 12 is provided over the compartment and has a water inlet 13 and a pair of openings 14 and 15, respectively.

The numeral 16 designates a faucet or other suitable means for supplying the water to the trough. The muriatic acid or other purifying agent is placed into the compartment 9 and will thoroughly mix with the water due to the slow flow of the water into the trough through the restricted openings 11 provided in the upper portion of the compartment's wall 10. An overflow pipe 17 is provided in one end portion of the trough and is threaded into a nipple 18 that is fixed to the bottom thereof, thus forming a suitable drain. It is understood that the said pipe and nipple are enameled or otherwise coated with a suitable acid-resisting material. The numeral 19 designates suitable cross pieces for supporting the trough.

From the foregoing description considered in connection with the accompanying drawing, it will be obvious that we have devised a most sanitary type of trough that will be most beneficial for the health of fowl.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:

A watering trough for fowl comprising an elongated rectangular receptacle constructed of an acid-resisting material and having a bottom and upwardly extending side and end walls, a drain in said bottom, a compartment for mixing acid and water formed in one end portion of the trough, said compartment having a transverse wall extending upwardly from the bottom of the trough and formed integral therewith, a removable cover on the upper end portion of said compartment, said cover having a plurality of openings for admitting water and acid into the compartment, and the upper portion of said transverse wall having a plurality of small apertures whereby mixed fluid may pass from said compartment into the trough.

MASON A. HOBURG.
FRANCES HOBURG.

REFERENCES CITED

The following references are of record in the file of this patent:

UNITED STATES PATENTS

| Number | Name | Date |
|---|---|---|
| 724,299 | Knobel | Mar. 31, 1903 |
| 995,415 | Steel | June 13, 1911 |
| 1,084,452 | Morris | Jan. 13, 1914 |
| 1,224,043 | Thompson | Apr. 24, 1917 |
| 1,449,983 | Getz et al. | Mar. 27, 1923 |